(12) United States Patent
Nessel et al.

(10) Patent No.: US 9,478,914 B2
(45) Date of Patent: Oct. 25, 2016

(54) MICRO PLUG AND KEYED MICRO RECEPTACLE

(71) Applicant: SANOFI-AVENTIS DEUTSCHLAND GMBH, Frankfurt am Main (DE)

(72) Inventors: Christian Nessel, Frankfurt am Main (DE); Ilona Eggert, Frankfurt am Main (DE); Michael Caspers, Frankfurt am Main (DE)

(73) Assignee: SANOFI-AVENTIS DEUTSCHLAND GMBH, Frankfurt am Main (DE)

( * ) Notice: Subject to any disclaimer, the term of this patent is extended or adjusted under 35 U.S.C. 154(b) by 185 days.

(21) Appl. No.: 14/371,780

(22) PCT Filed: Feb. 8, 2013

(86) PCT No.: PCT/EP2013/052592
§ 371 (c)(1),
(2) Date: Jul. 11, 2014

(87) PCT Pub. No.: WO2013/117724
PCT Pub. Date: Aug. 15, 2013

(65) Prior Publication Data
US 2014/0354217 A1    Dec. 4, 2014

(30) Foreign Application Priority Data
Feb. 9, 2012  (EP) .................................... 12154775

(51) Int. Cl.
*H01R 13/648*  (2006.01)
*H01R 13/645*  (2006.01)
(Continued)

(52) U.S. Cl.
CPC ........ *H01R 13/6456* (2013.01); *H01R 13/506* (2013.01); *H01R 13/64* (2013.01);
(Continued)

(58) Field of Classification Search
CPC ...................................................... H01R 13/64
USPC ............................................ 439/607.01, 680
See application file for complete search history.

(56) References Cited

U.S. PATENT DOCUMENTS

| 4,611,878 | A * | 9/1986 | Hall | ...... H01R 9/032 439/353 |
| 6,234,827 | B1 * | 5/2001 | Nishio | ...... H01R 13/6275 439/357 |

(Continued)

FOREIGN PATENT DOCUMENTS

EP    1821371    8/2007

OTHER PUBLICATIONS

International Search Report for Int. App. No. PCT/EP2013/052592, completed Apr. 12, 2013.

*Primary Examiner* — Vanessa Girardi
(74) *Attorney, Agent, or Firm* — McDonnell Boehnen Hulbert & Berghoff LLP

(57) ABSTRACT

The present patent application inter alia relates to a micro plug and a modified standard micro receptacle. The modified standard micro receptacle comprises a housing, at least two contact terminals attached to a surface of a bar of the housing, a shield attached to the housing and at least partially laterally enclosing the at least two contact terminals and the bar of the housing, and at least one projection configured to be received in a recess of a corresponding micro plug when the micro plug is correctly inserted into the modified standard micro receptacle. Therein, the at least one projection is further configured to hinder an insertion of a standard micro plug into the modified standard micro receptacle.

17 Claims, 6 Drawing Sheets

(51) Int. Cl.
  *H01R 13/506* (2006.01)
  *H01R 13/64* (2006.01)
  *H01R 13/6581* (2011.01)
  *H01R 27/00* (2006.01)
  *H02J 7/00* (2006.01)
  *H02J 7/02* (2016.01)

(52) U.S. Cl.
  CPC .......... *H01R13/6581* (2013.01); *H01R 27/00* (2013.01); *H02J 7/0029* (2013.01); *H02J 7/0042* (2013.01); *H02J 7/02* (2013.01); *H02J 2007/0001* (2013.01)

(56) References Cited

U.S. PATENT DOCUMENTS

| | | | |
|---|---|---|---|
| 6,299,487 B1* | 10/2001 | Lopata | H01R 13/65802 439/607.01 |
| 7,470,154 B2* | 12/2008 | Sato | H01R 13/03 439/693 |
| 2006/0024997 A1 | 2/2006 | Teicher | |
| 2009/0088024 A1 | 4/2009 | Ling et al. | |
| 2010/0268053 A1 | 10/2010 | Ghesquiere et al. | |

* cited by examiner

MICRO PLUG AND KEYED MICRO RECEPTACLE

CROSS REFERENCE TO RELATED APPLICATIONS

The present application is a U.S. National Phase application pursuant to 35 U.S.C. §371 of International Application No. PCT/EP2013/052592 filed Feb. 8, 2013, which claims priority to European Patent Application No. 12154775.6 filed Feb. 9, 2012. The entire disclosure contents of these applications are herewith incorporated by reference into the present application.

TECHNICAL FIELD

The present patent application inter alia relates to a micro plug and a micro receptacle, preferably a micro plug and a modified Universal Serial Bus Micro-USB receptacle.

In the following reference is made to Micro-USB for exemplary purpose only, the invention is also applicable to other standardized micro plugs and/or micro receptacles such as plugs and/or receptacles complying with a USB specification such as USB 1.0, 1.1, 2.0 and 3.0 or with Firewire (e.g. IEEE 1394a, IEEE 1394b and/or IEEE 1394-2008).

BACKGROUND

Nowadays, batteries of portable consumer devices such as mobile phones and MP3-players are typically charged by a charging device via a Universal Serial Bus Micro-USB power connection. Following a request from the European Commission, major producers of mobile phones have for instance agreed in a Memorandum of Understanding to harmonise charging devices for data-enabled mobile phones sold in the European Union on the basis of Micro-USB power connection. Accordingly, a single charging device may be used for charging more than one of these portable devices.

In the field of medical devices often more strict (governmental) regulations and (industry) standards apply than in the field of consumer devices. For instance, European Standard EN 60101-1 requires a double insulation between the medical device and the main voltage. To comply with these regulations and standards, batteries of portable medical devices are typically charged by a proprietary charging device via a proprietary power connection.

Use of such a proprietary charging device is however inconvenient for users, because the charging device may only be used for charging a battery of a single portable medical device. Furthermore, the proprietary charging device may become worthless, when the corresponding portable medical device is broken.

SUMMARY

The present invention inter-alia faces the problem of solving these objects.

According to an embodiment of a first aspect of the present invention, a micro plug being insertable into a standard micro receptacle, preferably a Universal Serial Bus Micro-USB receptacle, even more preferably a Micro-USB A-, B- or AB-type receptacle, comprises a housing, at least two contact pins attached to the housing, a shield attached to the housing and at least partially laterally enclosing the at least two contact pins, and at least one recess arranged in a portion of the shield. Therein, the at least one recess is configured to receive a projection of a correspondingly modified standard micro receptacle, preferably a modified Micro-USB receptacle, when the micro plug is inserted into the modified standard micro receptacle.

A micro plug should preferably be understood to relate to a plug that is insertable into a receptacle with an opening diameter of less than 1.5 cm, preferably less 1 cm, even more preferably less than 0.75 cm.

The housing may for instance be made from an insulator such as plastic. The housing may for instance be produced by molding.

For instance the number of contact pins may be four or five. The contact pins may be made from a conductor. The contact pins may for instance be produced by plating with at least one of Au, Ni-PD and Ni.

For instance, the configuration of the housing and/or of the contact pins may comply with the specification of a Micro-USB plug as defined in the Universal Serial Bus Micro-USB Cables and Connectors Specification, for instance a Micro-USB A-type or B-type plug. Accordingly, it may not be necessary to adapt the production process of the housing and/or the contact pins.

The shield may for instance be produced by stamping. For instance, the shied may be made from stainless steel or an equivalent material.

The configuration of the shield may for instance differ from the specification of a Micro-USB plug as defined in the Universal Serial Bus Micro-USB Cables and Connectors Specification. For instance, the at least one recess arranged in a portion of the shield may not be necessary in view of this specification. The portion of the shield in which the recess is arranged may preferably be a portion of the shield that is modifiable without having a hindering impact on insertion of the micro plug into a (standard) Micro-USB receptacle (i.e. a Micro-USB receptacle as defined in the Universal Serial Bus Micro-USB Cables and Connectors Specification). To produce such a modified shield, for instance, only the stamping tool for the shield may be modified. However, no additional parts may be necessary to assemble the micro plug. Accordingly, the assembling process of the micro plug may be similar to an assembling process of a standard Micro-USB plug.

For instance, the at least one recess may be necessary, to allow insertion of the micro plug into a correspondingly modified standard micro receptacle, preferably a modified Micro-USB receptacle. Such a modified standard micro receptacle (e.g. a modified Micro-USB receptacle) may for instance be a proprietary Micro-USB receptacle. For instance, the modified standard micro receptacle of the second aspect of the present invention as described below in more detail may be such a modified standard micro receptacle. The at least one recess may however not hinder insertion of the micro plug into a standard micro receptacle, preferably a (standard) Micro-USB receptacle.

The length and/or the diameter of the recess may at least correspond to the length and/or the diameter of the projection of the modified standard micro receptacle. For instance, the length (the diameter) of the recess is at least 5 percent, preferably at least 10 percent, larger than the length (the diameter) of the projection of the modified standard micro receptacle. For instance, the diameter of the recess may be larger than 1 mm and the diameter of the projection may be less than 0.75 mm. Preferably, the diameter of the recess may be equal to or larger than 1.2 mm and the diameter of the projection may be equal to or less than 0.5 mm.

There may be more than one recess. For instance, there may be two recesses arranged in the same or opposite portions of the shield.

Insertion of the micro plug into a micro receptacle should preferably be understood such that the dimensions of the micro plug allow correct insertion of the micro plug into the micro receptacle without damaging the micro plug and/or the micro receptacle.

Insertion of the micro plug into a micro receptacle should preferably be understood to relate to provide a mechanical and an electrical connection between the micro plug and the micro receptacle. The mechanical connection may preferably be releasable. The electrical connection may for instance be a Micro-USB power connection, a Micro-USB communication connection, a serial data connection, a parallel data connection, a Universal Asynchronous Receiver Transmitter (UART) data connection and/or any proprietary electrical connection. A Micro-USB power connection is preferably to be understood to relate to a Micro-USB connection via which power is supplied from a device (e.g. a charging device) to another device (e.g. a portable device), for instance a connection electrically and/or mechanically complying with a USB specification such as USB 1.0, 1.1, 2.0 and 3.0. A Micro-USB communication connection is preferably to be understood to relate to a Micro-USB connection via which data are communicated between at least two devices, for instance a connection electrically and/or mechanically complying with a USB specification such as USB 1.0, 1.1, 2.0 and 3.0.

The micro plug of the first aspect of the invention allows insertion into a standard micro receptacle and a modified standard micro receptacle, preferably into a (standard) Micro-USB receptacle and a modified Micro-USB receptacle. This is inter-alia advantageous to improve the (downward) compatibility of devices electrically complying with a standard such as a USB specification (e.g USB 1.0, 1.1, 2.0 and 3.0) and additionally complying with more strict regulations and/or standards.

Furthermore, the production and assembling process of the micro plug of the first aspect of the invention may only slightly differ from the production and assembling process of a standard micro plug such as a (standard) Micro-USB plug (i.e. a Micro-USB plug as defined in the Universal Serial Bus Micro-USB Cables and Connectors Specification). This is inter-alia advantageous to allow a simple and cost effective production and assembling of the micro plug of the first aspect of the invention.

According to an embodiment of the first aspect of the present invention, the portion of the shield in which the at least one recess is arranged is adjacent to the at least two contact pins. For instance, this portion of the shield may be at least substantially parallel to a layer defined by the at least two contact pins.

For instance, the portion of the shield in which the at least one recess is arranged may be a top or bottom portion of the shield. The top and bottom portion of the shield may preferably be understood to relate to the at least substantially coplanar and dominating portions of the shield. The lateral portions of the shield may preferably be understood to relate to the at least substantially planar and non-dominating portions of the shield. Arranging a recess in a lateral portion of the shield may hinder insertion of the micro plug into a standard micro receptacle.

According to an embodiment of the first aspect of the present invention, the micro plug further comprises fastening means, wherein the portion of the shield in which the at least one recess is arranged is laterally defined by the fastening means. For instance, the portion of the shield in which the at least one recess is arranged may be defined such that it does not interfere with the operational sphere of the fastening means. The fastening means may for instance serve for (e.g. releasably) fasten the micro plug in a micro receptacle.

The fastening means may for instance be arranged at a top and/or bottom portion of the shield. The fastening means may for instance be latches arranged at a bottom portion of the shield as defined in the Universal Serial Bus Micro-USB Cables and Connectors Specification for a Micro-USB plug. This embodiment is inter-alia advantageous to ensure correct functioning of the fastening means.

According to an embodiment of the first aspect of the present invention, the micro plug is comprised of a charging device for a portable medical device. For instance, the charging device may be double insulated and/or a so-called Class II device. For instance, the charging device may comply with European Standard EN 60101-1. In particular, the charging device may provide a double insulation between the main voltage a device connected to the charging device via the micro plug.

According to an embodiment of a second aspect of the present invention, a modified standard micro receptacle, preferably a modified Universal Serial Bus Micro-USB receptacle, comprises a housing, at least two contact terminals attached to a surface of a bar of the housing, a shield attached to the housing and at least partially laterally enclosing the at least two contact terminals and the bar of the housing, and at least one projection configured to be received in a recess of a corresponding micro plug when the micro plug is correctly inserted into the modified standard micro receptacle. Therein, the at least one projection is further configured to hinder an insertion of a standard micro plug, preferably a Micro-USB Plug, even more preferably a Micro-USB A-type plug and/or a Micro-USB B-type plug, into the modified standard micro receptacle.

A micro receptacle should preferably be understood to relate to a receptacle with an opening diameter of less than 1.5 cm, preferably less 1 cm, even more preferably less than 0.75 cm.

For instance, the number of contact terminals may be four or five. The contact terminals may be made from a conductor. The contact terminals may for instance be produced by plating with at least one of Au, Ni-PD and Ni.

For instance, the configuration of the contact terminals may comply with the specification of a Micro-USB receptacle as defined in the Universal Serial Bus Micro-USB Cables and Connectors Specification, for instance a Micro-USB A-, B- or AB-type receptacle. The modified standard micro receptacle may preferably be a modified Micro-USB receptacle.

The housing may for instance be made from an insulator such as plastic. The housing may for instance be produced by molding.

The shield may for instance be produced by stamping. For instance, the shied may be made from stainless steel or an equivalent material.

For instance, the at least one projection may be arranged at the shield and/or at the housing. For instance, the configuration of the shield and/or the configuration of the housing may respectively differ from the specification of a Micro-USB A-, B- or AB-type receptacle as defined in the Universal Serial Bus Micro-USB Cables and Connectors Specification.

For instance, apart from the at least one projection the modified standard micro receptacle may comply with the specification of a Micro-USB receptacle as defined in the Universal Serial Bus Micro-USB Cables and Connectors Specification. Accordingly, an assembling process of the modified standard micro receptacle may be similar to an assembling process of a Micro-USB receptacle, such as a Micro-USB A-, or B- or AB-type receptacle.

The at least one projection may key the modified standard micro receptacle such that an insertion of a standard micro plug, preferably a (standard) Micro-USB plug, into the modified standard micro receptacle is hindered (e.g. prevented). Hindering of an insertion should preferably be understood to relate to a prevention of an insertion of a standard micro plug inserted with a force of less than 75N, preferably less than 100N, even more preferably less than 150N without damaging the modified standard micro receptacle. This is inter-alia advantageous to at least prevent an unintentional insertion of a standard micro plug, preferably a (standard) Micro-USB plug, into the modified standard micro receptacle.

For instance, only a corresponding micro plug comprising a recess configured to receive the at least one projection when inserted into the modified standard micro receptacle may be inserted into the modified standard micro receptacle without damaging the micro plug and/or the modified standard micro receptacle. The micro plug of the first aspect of the present invention may be such a corresponding micro plug.

The length and/or the diameter of the at least one projection may at least correspond to the length and/or the diameter of the recess of the corresponding micro plug. For instance, the length (the diameter) of the at least one projection is at least 5 percent, preferably at least 10 percent, smaller than the length (the diameter) of the recess of the corresponding micro plug. For instance, the diameter of the projection may be less than 0.75 mm and the diameter of the recess may be larger than 1 mm. Preferably, the diameter of the projection may be equal to or less than 0.5 mm and the diameter of the recess may be equal to or larger than 1.2 mm.

Insertion of a corresponding micro plug into the modified standard micro receptacle should preferably be understood to relate to provide a mechanical and an electrical connection between the micro plug and the modified standard micro receptacle. The mechanical connection may preferably be releasable. The electrical connection may for instance be a Micro-USB power connection, a Micro-USB communication connection, a serial data connection, a parallel data connection, a UART data connection and/or any proprietary electrical connection as described in more detail above.

The modified standard micro receptacle of the second aspect of the invention prevents insertion of a standard micro plug, for instance a (standard) Micro-USB receptacle, but allows insertion of a corresponding micro plug. This is inter-alia advantageous to only allow an electrical connection between devices electrical complying with a proprietary specification and/or more strict regulations and/or standards than a USB specification such as USB 1.0, 1.1, 2.0 and 3.0.

Furthermore, the production and assembling process of the modified standard micro receptacle of the second aspect of the invention may only slightly differ from the production and assembling process of a standard micro receptacle such as a (standard) Micro-USB receptacle. This is inter-alia advantageous to allow a simple and cost effective production and assembling thereof.

According to an embodiment of the second aspect of the present invention, the at least one projection at least carries an insertion force of less than 150N.

The carrying capacity of the at least one projection inter-alia depends on the arrangement, the material and/or the dimensions of the at least one projection. For instance, the diameter of a projection arranged at the shield and integrally formed with the shield may have a diameter equal to or larger than 0.25 mm to carry at least an insertion force of 150N. For instance, the diameter of a projection arranged at the bar of the housing and integrally formed with the housing may have a diameter equal to or larger than 0.15 mm to carry at least an insertion force of 150N. Alternatively or additionally, the modified standard micro receptacle may comprise more than one projection to ensure the carrying capacity of 150N and/or to increase the carrying capacity.

As described above, this embodiment is inter-alia advantageous to at least hinder insertion of a standard micro plug, for instance a (standard) Micro-USB plug, into the modified standard micro receptacle.

According to an embodiment of the second aspect of the present invention, the at least one projection is arranged at a portion of the shield. For instance, the at least one projection may be integrally formed with the shield. To produce such a modified shield, for instance, only the stamping tool for the shield may be modified. However, no additional parts may be necessary to assemble the modified standard micro receptacle. Accordingly, the assembling process of the modified standard micro receptacle may be similar to an assembling process of a standard micro receptacle, for instance a (standard) Micro-USB receptacle. This embodiment is inter-alia advantageous to allow a simple and cost effective production and assembling of the modified standard micro receptacle.

According to an embodiment of the second aspect of the present invention, the portion of the shield is adjacent to the at least two contact terminals and/or to a surface of the bar to which the at least two contact terminals are attached and/or to a surface of the bar opposite of the surface to which the at least two contact terminals are attached. For instance, this portion of the shield may be at least substantially parallel to layer defined by the at least two contact terminals.

For instance, the portion of the shield in which the at least one projection is arranged may be a top or bottom portion of the shield. The top and bottom portion of the shield may preferably be understood to relate to the at least substantially coplanar and dominating portions of the shield. The lateral portions of the shield may preferably be understood to relate to the at least substantially planar and non-dominating portions of the shield.

According to an embodiment of the second aspect of the present invention, the modified standard micro receptacle further comprises fastening means, wherein the portion of the shield at which the at least one projection is arranged is laterally defined by the fastening means. For instance, the portion of the shield at which the at least one projection is arranged may be defined such that it does not interfere with the operational sphere of the fastening means. The fastening means may for instance serve for (e.g. releasably) fasten the corresponding micro plug in the modified standard micro receptacle.

The fastening means may for instance be arranged at a top and/or bottom portion of the shield. The fastening means may for instance be latch openings arranged in bottom portion of the shield as defined in the Universal Serial Bus Micro-USB Cables and Connectors Specification for a Micro-USB receptacle.

This embodiment is inter-alia advantageous to ensure correct functioning of the fastening means.

According to an embodiment of the second aspect of the present invention, the at least one projection is arranged at a surface of the bar of the housing, wherein the surface of the bar of the housing is opposite of the surface of the bar to which the contact terminals are attached. For instance, the at least one projection may be integrally formed with the housing (e.g. with the bar of the housing). To produce such a modified shield, for instance, only the molding tool for the housing may be modified. However, no additional parts may be necessary to assemble the modified standard micro receptacle. Accordingly, the assembling process of the modified standard micro receptacle may be similar to an assembling process of a standard micro receptacle, for instance a (standard) Micro-USB receptacle. This embodiment is inter-alia advantageous to allow a simple and cost effective production and assembling of the modified standard micro receptacle.

According to an embodiment of the second aspect of the present invention, a micro plug of the first aspect of the invention is insertable into the modified standard micro receptacle.

According to an embodiment of the second aspect of the present invention, wherein the modified standard micro receptacle is comprised of a portable medical device. For instance the portable medical device may be a drug delivery device such as a medical device configured to eject a drug agent (e.g. a dose of a medicament) such as an infusion device or an injection device, for instance an insulin injection pen. Injection devices may be used either by medical personnel or by patients themselves. As an example, type-1 and type-2 diabetes may be treated by patients themselves by injection of insulin doses, for example once or several times per day.

For instance, the portable medical device is configured to eject at least two drug agents from separate reservoirs comprising a first and a second medicament, respectively, but it is not limited thereto. Alternatively, the portable medical device is for instance a conventional medical device configured to eject a drug agent from a single reservoir such as Applicant's Solostar® insulin injection pen.

For instance, the modified standard micro receptacle may be (e.g. internally) connected to a battery unit of the portable medical device such that a battery of the portable medical device is chargeable via the modified standard micro receptacle. The battery unit may for instance comprise the battery and a battery controller controlling charging of the battery. The battery may for instance be a lithium ion battery or a NiMH-battery.

For instance, the modified standard micro receptacle may be (e.g. internally) connected to a processing unit of the portable medical device such that the processing unit can receive and/or transmit data via the modified standard micro receptacle. The processing unit may for instance comprise a processor and a memory. For instance, the processing unit may transmit monitored data to an external device via the modified standard micro receptacle, and/or the processing unit may receive programming data from an external device via the modified standard micro receptacle. The data may be transmitted and/or received according to a USB specification such as USB 1.0, 1.1, 2.0 and 3.0, but may equally well transmitted according to another industry and/or proprietary specification.

According to an embodiment of a third aspect of the present invention, a system comprises a portable medical device comprising a modified standard micro receptacle of the second aspect of the present invention, and a charging device comprising a micro plug of the first aspect of the invention. Therein, the micro plug is inserted into the modified standard micro receptacle such that the at least one projection of the modified standard micro receptacle is received in the at least one recess of the micro plug.

According to an embodiment of the third aspect of the present invention, the at least two contact pins and the at least two contact terminals form an electrical connection between the charging device and the portable medical device. The electrical connection may for instance be a Micro-USB power connection, a Micro-USB communication connection, a serial data connection, a parallel data connection, a UART data connection and/or any proprietary electrical connection as described in more detail above.

According to an embodiment of the third aspect of the present invention, the charging device charges a battery of the portable medical device via the electrical connection, wherein the electrical connection is a Micro-USB power connection.

According to an embodiment of a fourth aspect of the present invention, a method comprises producing and/or assembling of a micro plug of the first aspect of the invention and/or a modified standard micro receptacle of the second aspect of the invention, wherein said assembling process corresponds to an assembling process of a standard micro plug (e.g. a Universal Serial Bus Micro-USB plug) and/or a standard micro receptacle (e.g. a Universal Serial Bus Micro-USB receptacle) such that said assembling can be performed by an assembling machine for assembling a standard micro plug and/or a standard micro receptacle.

BRIEF DESCRIPTION OF THE FIGURES

These as well as other advantages of various aspects of the present invention will become apparent to those of ordinary skill in the art by reading the following detailed description, with appropriate reference to the accompanying drawings, in which.

DETAILED DESCRIPTION

Figure 1A:
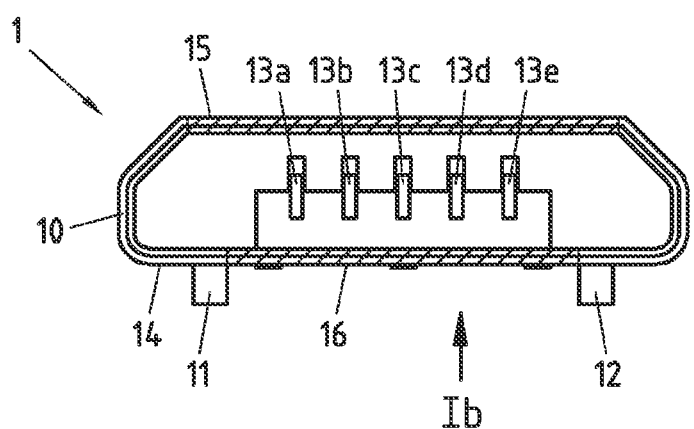
FIGS. 1a and 1b schematically illustrate a Micro-USB B-type plug.
Figure 1B:
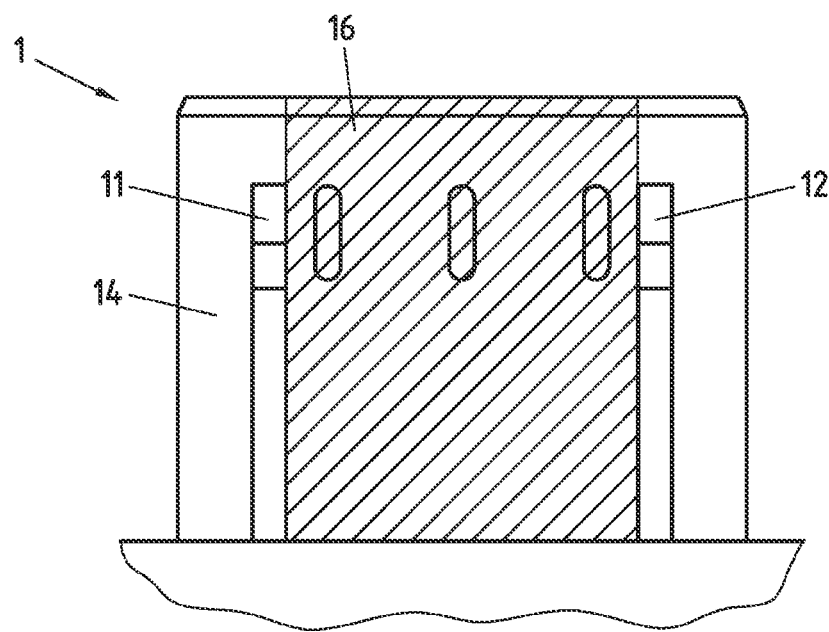

Micro plug 1 illustrated in FIGS. 1a and 1b is a Micro-USB B-type plug as defined in the Universal Serial Bus Micro-USB Cables and Connectors Specification. FIG. 1a is a front view of micro plug 1, FIG. 1b is a bottom view of micro plug 1 as indicated by arrow Ib.

Micro plug 1 comprises a shield 10, latches 11 and 12, contact pins 13a to 13e and a housing. Shield 10 at least partially encloses contact pins 13a to 13e. Fasteners shown as latches 11 and 12 are arranged at a bottom portion 14 of shield 10. opposite of bottom portion 14 of shield 10 is top portion 15 of shield 10.

Bottom portion 14 and top portion 15 are adjacent to contact pins 13a to 13e. In particular, bottom portion 14 and top portion 15 are at least substantially parallel to a layer defined by contact pins 13a to 13e.

Shaded portion 16 of bottom portion 14 of shield 10 relates to a portion thereof in which a recess may be arranged without having a hindering impact on insertion of the micro plug into a Micro-USB B-type receptacle as defined in the Universal Serial Bus Micro-USB Cables and Connectors Specification. Shaded portion 16 is laterally defined by latches 11 and 12 such that latches 11 and 12 are arranged outside of shaded portion 16. Top portion 15 of shield 10 relates to a portion thereof in which a recess may be arranged without having a hindering impact on insertion of the micro plug into a Micro-USB B-type receptacle as defined in the Universal Serial Bus Micro-USB Cables and Connectors Specification. This is indicated by entirely shading top portion 15 in FIG. 1a.

Figure 2A:
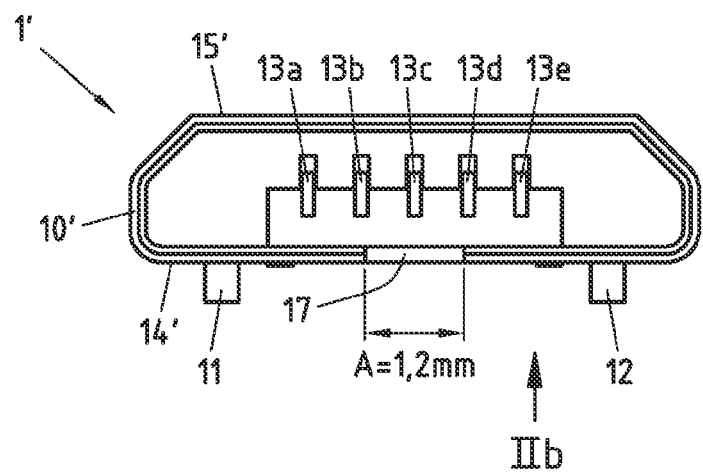
FIGS. 2a and 2b schematically illustrate a micro plug according to an embodiment of the first aspect of the invention.
Figure 2B:
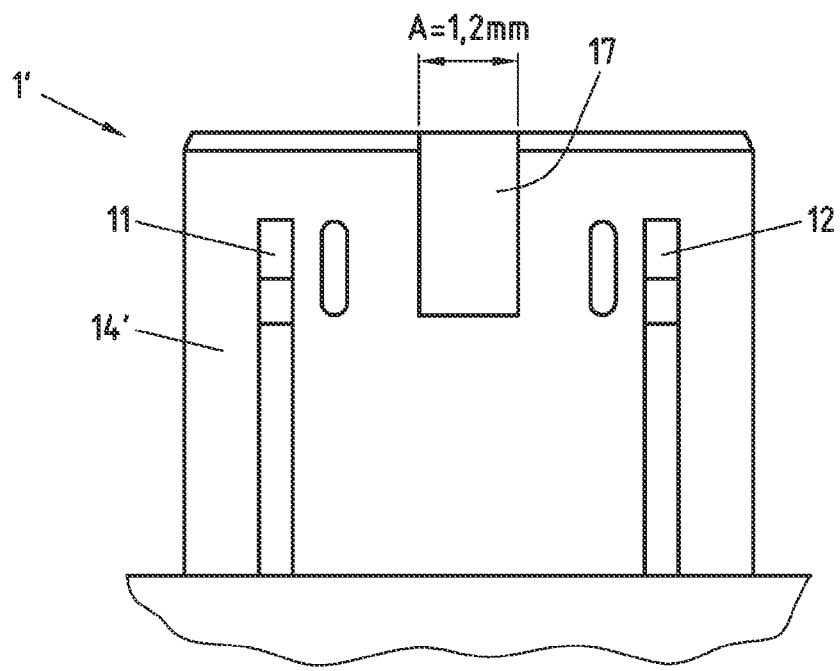

Micro plug 1' illustrated in FIGS. 2a and 2b is a micro plug according to an embodiment of the first aspect of the invention. FIG. 2a is a front view of micro plug 1', FIG. 2b is a bottom view of micro plug 1' as indicated by arrow IIb.

Micro plug 1' basically corresponds to micro plug 1 as illustrated in FIGS. 1a and 1b and, thus, corresponding parts have been denoted with the same reference number. In particular, micro plug 1' also comprises latches 11 and 12, contact pins 13a to 13e and a housing. Furthermore, micro plug 1' comprises a modified shield 10' at least partially enclosing contact pins 13a to 13e. Latches 11 and 12 are arranged at a bottom portion 14' of shield 10'. Opposite of bottom portion 14' of shield 10' is top portion 15' of shield 10'.

Micro plug 1' only differs from micro plug 1 by a recess 17 arranged in bottom portion 14' of modified shield 10'. In particular, recess 17 of modified shield 10' of micro plug 1' is arranged in shaded portion 16 as indicated in FIGS. 1a and 1b. Alternatively or additionally, a recess of modified shield 10' may be arranged in shaded portion 15 as indicated in FIG. 1a.

Recess 17 runs from an edge of shield 10'. Recess diameter A of recess 17 is 1.2 mm in the embodiment of FIGS. 2a and 2b, but may equally well be larger or smaller. Recess 17 is laterally centered in bottom portion 14' of modified shield 10' in the embodiment of FIG. 2, but may equally well not be laterally centered in bottom portion 14' of modified shield 10'. In particular, recess 17 is arranged such that it receives projection 28 of micro receptacle 2' and/or projection 29 of micro receptacle 2" as described in more detail below, when micro plug 1' is inserted into micro receptacle 2' and/or micro receptacle 2".

Since recess 17 is the only difference between micro plug 1' and micro plug 1, their production and assembly process may only slightly differ. For instance, only the production of their shields may be different.

Micro plug 1' can be inserted into a (standard) Micro-USB receptacle and a modified Micro-USB receptacle such as micro receptacles 2' and 2" as described in more detail below.

Figure 3A:
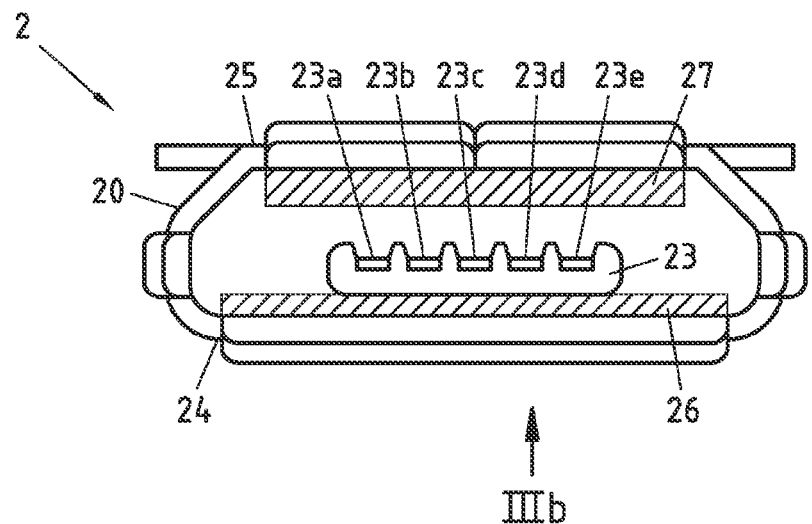
FIGS. 3a and 3b schematically illustrate a Micro-USB B-type receptacle.
Figure 3B:
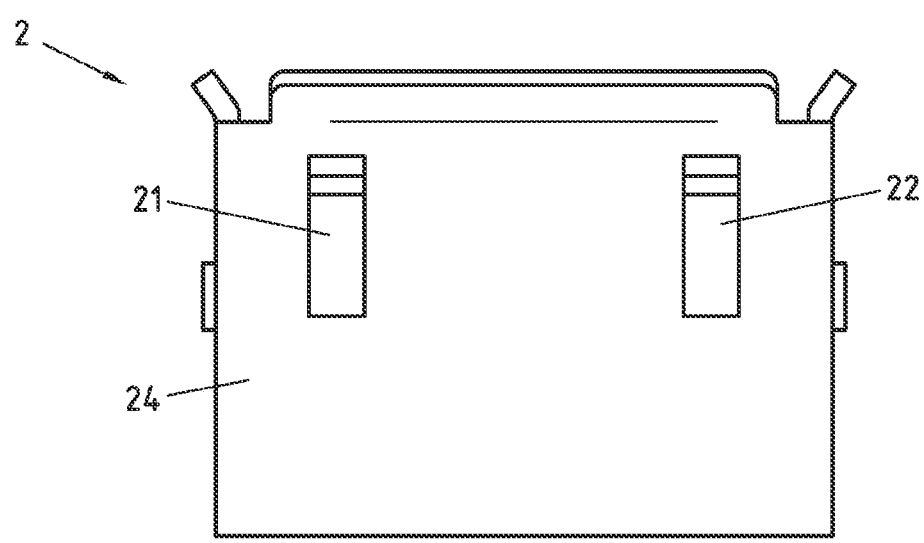

Micro receptacle 2 illustrated in FIGS. 3a and 3b is a Micro-USB B-type receptacle as defined in the Universal Serial Bus Micro-USB Cables and Connectors Specification. FIG. 3a is a front view of micro receptacle 2, FIG. 3b is a bottom view of micro receptacle 2 as indicated by arrow Mb.

Micro receptacle 2 comprises a shield 20, latch openings 21 and 22, a bar 23, contact terminals 23a to 23e and a housing. Shield 20 at least partially encloses contact terminals 23a to 23e and bar 23. Latch openings 21 and 22 are arranged in a bottom portion 24 of shield 20. opposite of bottom portion 24 of shield 20 is top portion 25 of shield 20.

Bottom portion 24 and top portion 25 are adjacent to contact terminals 23a to 23e. In particular, bottom portion 24 and top portion 25 are at least substantially parallel to a layer defined by contact terminals 23a to 23e. Bar 23 is part of the housing of micro receptacle 2. As shown in FIG. 3a, contact terminals 23a to 23e are attached to a surface of bar 23 facing top portion 25 of shield 20.

Shaded portion 26 of micro receptacle 2 relates to a portion thereof in which a projection may be arranged having a hindering impact on insertion of a (standard) Micro-USB plug into the micro receptacle. Shaded portion 26 is laterally defined by latch openings 21 and 22. Shaded portion 26 of micro receptacle 2 runs from the surface of bottom portion 24 facing bar 23 to the surface of bar 23 facing bottom portion 24 (i.e. the surface of bar 23 opposite of the surface of bar 23 to which contact terminals 23a to 23e are attached).

Shaded portion 27 of micro receptacle 2 relates to a portion thereof in which a projection may be arranged having a hindering impact on insertion of a (standard) Micro-USB plug into the micro receptacle. Shaded portion 27 of micro receptacle 2 runs from the surface of top portion 25 facing bar 23, but ends before the surface of bar 23 facing top portion 25 (i.e. the surface of bar 23 to which contact terminals 23a to 23e are attached) such that contacting of contact terminals 23a to 23e is not hindered by a projection arranged in shaded portion 27.

Figure 4A:
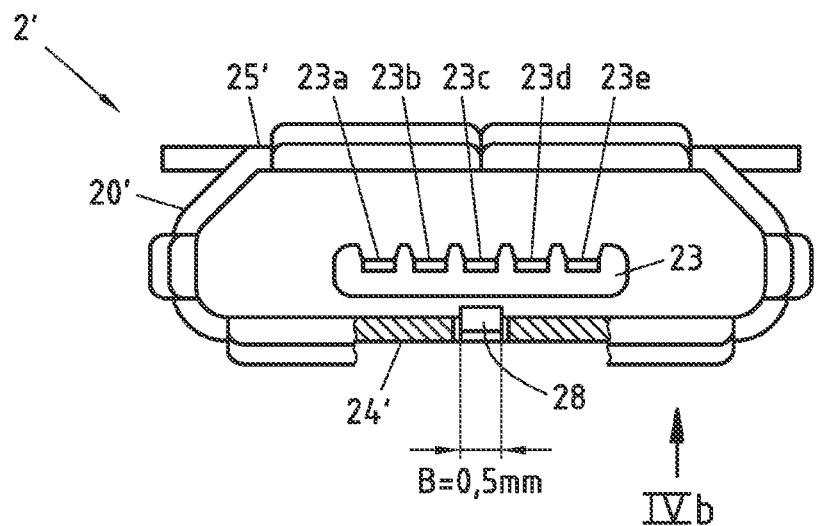
FIGS. 4a and 4b schematically illustrate a modified Micro-USB receptacle according to an embodiment of the second aspect of the invention.
Figure 4B:
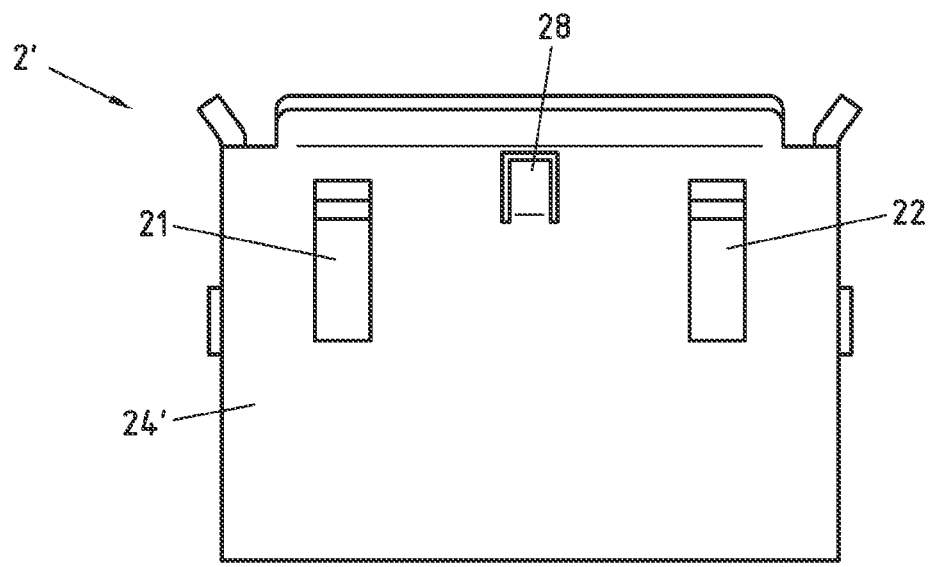

Micro receptacle 2' illustrated in FIGS. 4a and 4b is a modified Micro-USB receptacle according to an embodiment of the second aspect of the invention. FIG. 4a is a front view of micro receptacle 2', FIG. 4b is a bottom view of micro receptacle 2' as indicated by arrow IVb.

Micro receptacle 2' basically corresponds to micro receptacle 2 as illustrated in FIGS. 3a and 3b and, thus, corresponding parts have been denoted with the same reference number. In particular, micro receptacle 2' also comprises latch openings 21 and 22, a bar 23, contact terminals 23a to 23e and a housing. Furthermore, micro receptacle 2' comprises a modified shield 20' at least partially enclosing contact pins 23a to 23e. Latch openings 21 and 22 are arranged in a bottom portion 24' of shield 20'. opposite of bottom portion 24' of shield 20' is top portion 25' of shield 20'.

Micro receptacle 2' only differs from micro receptacle 2 by a projection 28 arranged at bottom portion 24' of modified shield 20'. In particular, projection 28 of modified shield 20' of micro receptacle 2' is arranged in shaded portion 26 as indicated in FIG. 4a. Alternatively or additionally, a projection may be arranged in shaded portion 27 as indicated in FIG. 4a.

Shield 20' may be formed from stainless steel. Projection 28 is arranged at and integrally formed with bottom portion 24' of shield 20'. Diameter B of projection 28 is 0.5 mm in the embodiment of FIGS. 4a and 4b, but may equally well be larger or smaller. Projection 28 is laterally centered in micro receptacle 2' in the embodiment of FIGS. 4a and 4b, but may equally well not be laterally centered in micro receptacle 2'. In particular, projection 28 is arranged such that it hinders insertion of a (standard) Micro-USB B-Type plug into micro receptacle 2', but allows micro plug 1' to be inserted into micro receptacle 2'.

Since projection 28 is the only difference between micro receptacle 2' and micro receptacle 2, their production and assembly process may only slightly differ. For instance, only the production of their shields may be different.

Figure 5A:
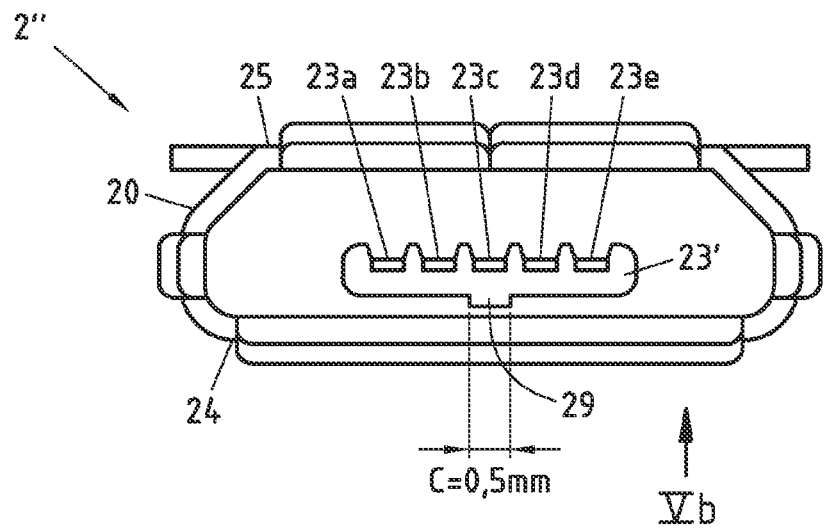
FIGS. 5a and 5b schematically illustrate a modified Micro-USB receptacle according to another embodiment of the second aspect of the invention.
Figure 5B:
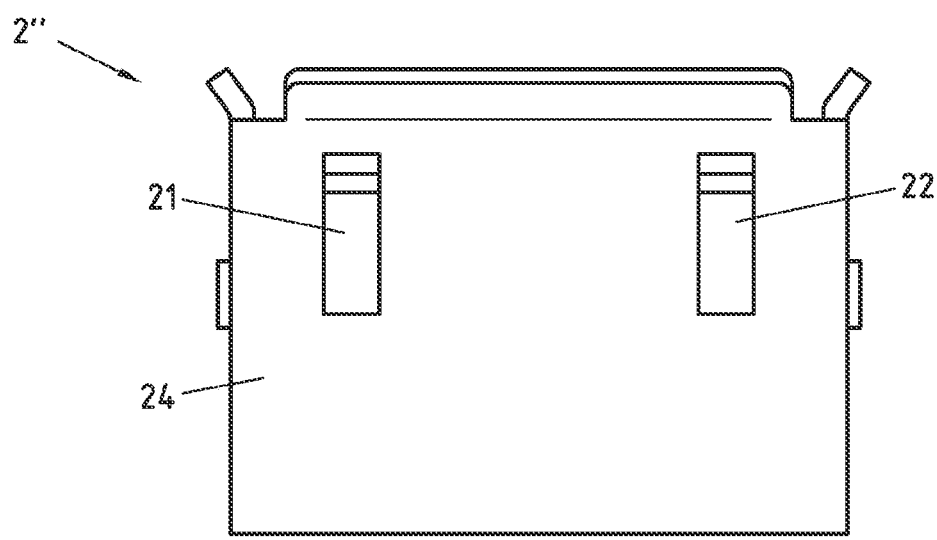

Micro receptacle 2" illustrated in FIGS. 5a and 5b is a modified Micro-USB receptacle according to another embodiment of the second aspect of the invention. FIG. 5a is a front view of micro receptacle 2", FIG. 5b is a bottom view of micro receptacle 2" as indicated by arrow Vb.

Micro receptacle 2" basically corresponds to micro receptacle 2 as illustrated in FIGS. 3a and 3b and, thus, corresponding parts have been denoted with the same reference number. In particular, micro receptacle 2" also comprises shield 20, latch openings 21 and 22, contact terminals 23a to 23e and a housing. Furthermore, micro receptacle 2' comprises a modified bar 23'.

Micro receptacle 2" only differs from micro receptacle 2 by a projection 29 arranged at modified bar 23'. In particular, projection 29 of modified bar 23' of micro receptacle 2' is arranged in shaded portion 26 as indicated in FIG. 3a.

Bar 23' is made from molded plastics. Projection 29 is arranged at and integrally formed with modified bar 23'. Diameter C of projection 29 is 0.5 mm in the embodiment of FIGS. 5a and 5b, but may equally well be larger or smaller. Projection 29 is laterally centered in micro receptacle 2" in the embodiment of FIGS. 5a and 5b, but may equally well not be laterally centered in micro receptacle 2". In particular, projection 29 is arranged such that it hinders insertion of a (standard) Micro-USB B-Type plug into micro receptacle 2", but allows micro plug 1' to be inserted into micro receptacle 2".

Since projection 29 is the only difference between micro receptacle 2" and micro receptacle 2, their production and assembly process may only slightly differ. For instance, only the production of their bars may be different.

Figure 6:
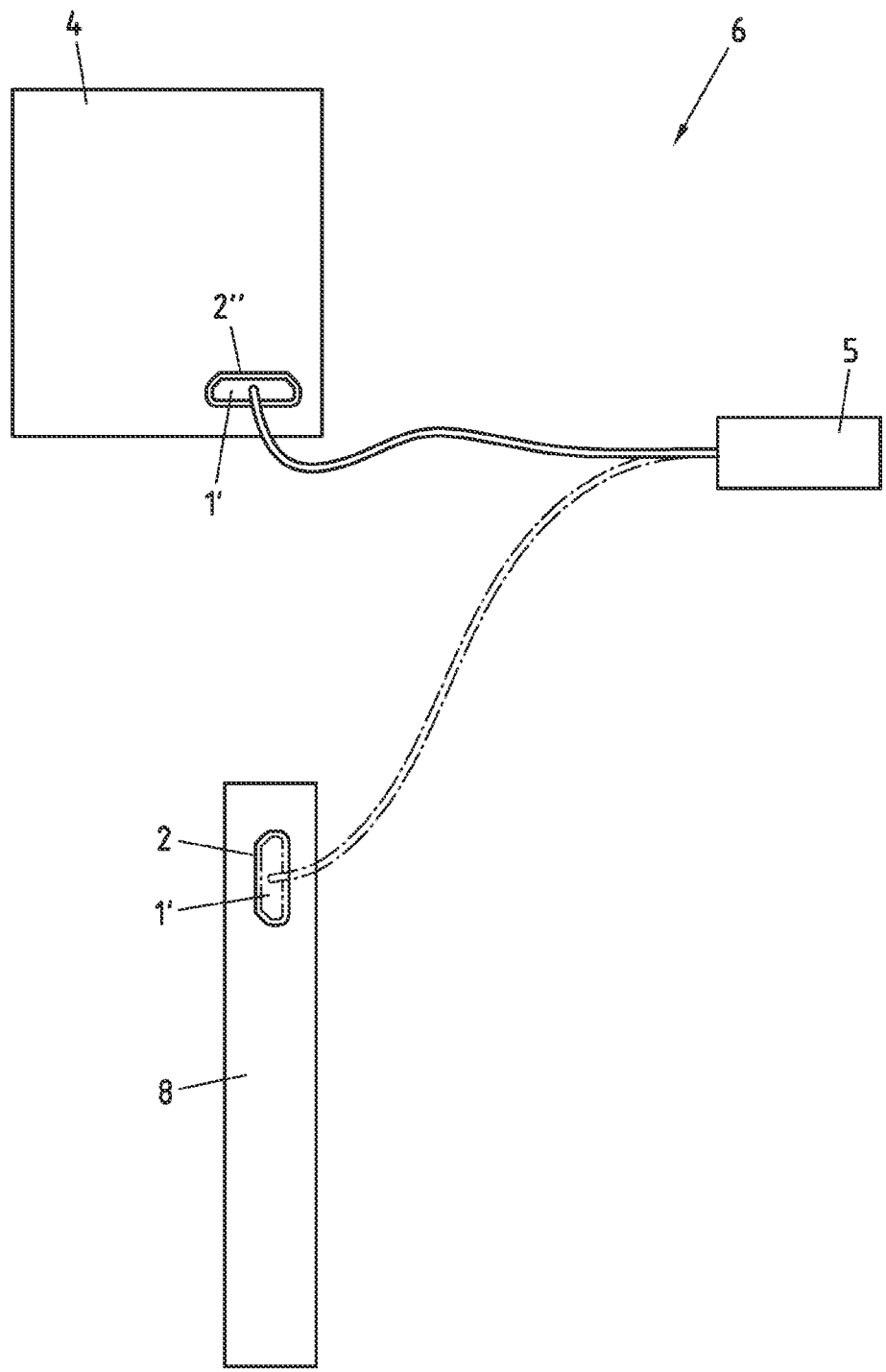
FIG. 6 schematically illustrates a system according to an embodiment of the third aspect of the invention.

System 6 illustrated in FIG. 6 is a system according to an embodiment of the third aspect of the invention. System 6 comprises a portable medical device 4, a charging device 5 and a portable consumer electronic device 8 such as a mobile phone.

Charging device 5 comprises a charging output port formed by micro plug 1' as described above, medical device 4 comprises a charging input port formed by micro receptacle 2" as described above, and portable consumer electronic device 8 comprises a charging input port formed by micro receptacle 2 which is a (standard) USB-Micro receptacle as described above.

Charging device 5 provides a double insulated USB power connection. For instance, a battery of medical device 4 must be charged by such a double insulating charging device (e.g. due to governmental regulations). Therefore, the charging input port of medical device 4, which is formed by micro receptacle 2", may only be connected with the charging output port of charging device 5, which is formed by micro plug 1', but not with a charging output port of a (standard) Micro-USB charging device, which is formed by a (standard) Micro-USB plug such as micro plug 1 as described above.

A battery of portable consumer electronic device 8 may be charged by any charging device providing a USB power connection such as a (standard) Micro-USB charging device. Therefore, the charging input port of portable consumer electronic device 8, which is formed by micro receptacle 2, may be connected with the charging output port of charging device 5, which is formed by micro plug 1', and with a charging output port of a (standard) Micro-USB charging device, which is formed by a (standard) Micro-USB plug such as micro plug 1 as described above.

As indicated in FIG. 6, charging device 5 may be connected to medical device 4 and to portable consumer electronic device 8. In particular, charging device 5 may charge the battery of medical device 4 and the battery of portable consumer electronic device 8 via these connections.

The present invention is thus inter-alia advantageous to only allow an electrical connection between devices (e.g. portable medical device 4) electrical complying with a proprietary specification and/or more strict regulations and/or standards than a USB specification. Furthermore, the present invention is inter-alia advantageous to ensure compatibility of devices comprising micro plug 1' and devices (e.g. portable consumer electronic device 8) comprising a (standard) Micro-USB receptacle.

Furthermore, the present invention is thus inter-alia advantageous to allow a simple and cost effective production and assembling of micro plug 1' and micro receptacles 2' and 2".

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

As used in this application, the wording "X comprises A and B" (with X, A and B being representative of all kinds of words in the description) is meant to express that X has at least A and B, but can have further elements. Furthermore, the undefined article "a" is—unless otherwise stated—not understood to mean "only one".

Furthermore, the term "drug" or "medicament", as used herein, means a pharmaceutical formulation containing at least one pharmaceutically active compound, wherein in one embodiment the pharmaceutically active compound has a molecular weight up to 1500 Da and/or is a peptide, a proteine, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exedin-3 or exedin-4 or an analogue or derivative of exedin-3 or exedin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des(B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyhepta¬ decanoyl) human insulin.

Exendin-4 for example means Exendin-4(1-39), a peptide of the sequence H His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39),
wherein the group -Lys6-NH2 may be bound to the C-terminus of the Exendin-4 derivative;

or an Exendin-4 derivative of the sequence
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(02)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4(1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4(1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(02)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp(O2) 25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2)25, Asp28] Exendin-4(S1-39)-(Lys)6-NH2,
H-Asn-(Glu)5-des Pro36, Pro37, Pro38 [Met(O)14, Trp(O2) 25, Asp28] Exendin-4(1-39)-(Lys)6-NH2;

or a pharmaceutically acceptable salt or solvate of any one of the afore-mentioned Exedin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two β sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region (CH) and the variable region (VH). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')2 fragment containing both Fab pieces and the hinge region, including the H—H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1 C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

The invention claimed is:

1. A micro plug being insertable into a standard micro receptacle, preferably a Universal Serial Bus Micro-USB receptacle, said micro plug comprising:
   a housing,
   at least two contact pins attached to said housing,
   a shield attached to said housing and at least partially laterally enclosing said at least two contact pins,
   a fastener, and
   at least one recess arranged in a portion of said shield,
   wherein said at least one recess is configured to receive a projection of a correspondingly modified standard micro receptacle when said micro plug is inserted into said modified standard micro receptacle, and wherein said portion of said shield is laterally defined by said fastener.

2. The micro plug of claim 1, further characterized in that it is configured to fit into a Universal Serial Bus Micro-USB receptacle.

3. The micro plug according to claim 1, wherein said portion of said shield is adjacent to a layer defined by said at least two contact pins.

4. The micro plug according to claim 1, wherein said fastener is arranged at a top or bottom portion of said shield.

5. The micro plug according to claim 1, wherein said micro plug is comprised of a charging device for a portable medical device.

6. A modified standard micro receptacle, comprising:
   a housing,
   at least two contact terminals attached to a surface of a bar of said housing,
   a shield attached to said housing and at least partially laterally enclosing said at least two contact terminals and said bar of said housing,
   a fastener, and
   at least one projection configured to be received in a recess of a corresponding micro plug when said micro plug is inserted into said modified standard micro receptacle,
   wherein said at least one projection is further configured to hinder an insertion of a standard micro plug into said modified standard micro receptacle, and
   wherein said at least one projection is arranged at a portion of said shield, wherein said portion of said shield is laterally defined by said fastener or wherein said at least one projection is arranged at a surface of said bar of said housing, wherein said surface of said bar of said housing is opposite of said surface of said bar to which said contact terminals are attached.

7. The modified standard micro receptacle according to claim 6 further characterized in that the standard micro receptacle initially was configured as a Universal Serial Bus Micro-USB receptacle.

8. The modified standard micro receptacle according to claim 6, wherein said at least one projection at least sustains an insertion force of less than 150N.

9. The modified standard micro receptacle according to claim 6, wherein said fastener is arranged at a top or bottom portion of said shield.

10. The modified standard micro receptacle according to claim 6, wherein said portion of said shield is adjacent to said at least two contact terminals or to a surface of said bar to which said at least two contact terminals are attached or to a surface of said bar opposite of said surface to which said at least two contact terminals are attached.

11. The modified standard micro receptacle according to claim 6, wherein said shield is produced by stamping.

12. The modified standard micro receptacle according to claim 6, wherein said housing is produced by molding.

13. The modified standard micro receptacle according to claim 6, wherein a micro plug according to claim 1 is insertable into said modified standard micro receptacle.

14. The modified standard micro receptacle according to claim 6, wherein said modified standard micro receptacle is comprised of a portable medical device.

15. A system, comprising:
- a portable medical device comprising a modified standard micro receptacle according to claim 6, and
- a charging device comprising a micro plug according to claim 1,
- wherein said micro plug is inserted into said modified standard micro receptacle such that said at least one projection of said modified standard micro receptacle is received in said at least one recess of said micro plug.

16. The system according to claim 15, wherein said at least two contact pins and said at least two contact terminals form an electrical connection between said charging device and said portable medical device.

17. The system according to claim 16, wherein said charging device charges a battery of said portable medical device via said electrical connection, wherein said electrical connection is a standard power connection.

* * * * *